United States Patent [19]

Sandusky et al.

[11] Patent Number: 5,405,683

[45] Date of Patent: Apr. 11, 1995

[54] NON-RECTANGULAR TOWPREG ARCHITECTURES

[75] Inventors: Donald A. Sandusky, Williamsburg; Joseph M. Marchello, Hampton; Robert M. Baucom, Newport News, all of Va.

[73] Assignee: The United States of America as represented by the Administrator of the National Aeronautics and Space Administration, Washington, D.C.

[21] Appl. No.: 141,293

[22] Filed: Oct. 20, 1993

[51] Int. Cl.6 ............................................. B32B 9/00
[52] U.S. Cl. ............................. 428/225; 428/102; 428/105; 428/232; 428/235; 428/286; 428/294; 428/295
[58] Field of Search ............... 428/225, 295, 235, 902, 428/102, 105, 286, 232, 294

[56] References Cited

U.S. PATENT DOCUMENTS 5,296,064  3/1994  Muzzy et al. .................. 156/180

OTHER PUBLICATIONS

Fairfax Northern Virginia Sun (FNVS) Apr. 5, 1979 p. 8.

*Primary Examiner*—Patrick J. Ryan
*Assistant Examiner*—Abraham Bahta
*Attorney, Agent, or Firm*—George F. Helfrich; Joy L. Bryant

[57] ABSTRACT

A shaped towpreg ribbon having a cross-sectional geometry which promotes intimate lateral contact between adjacent composite tows was prepared. The cross-sectional geometry is non-rectangular and promotes intimate lateral contact between adjacent towpreg ribbons during normal processing.

3 Claims, 2 Drawing Sheets

NON-RECTANGULAR TOWPREG ARCHITECTURES

ORIGIN OF THE INVENTION

The invention described herein was made by an employee of the United States Government and two contract employees in the performance of work under NASA Grant Numbers NGT 51008 and NAG 1067 and is subject to the provisions of Public Law 96-517 (35 U.S.C. 202) in which the contractors have elected not to retain title.

CROSS-REFERENCE TO RELATED APPLICATIONS

This application is related to co-pending patent application Ser. No. 08/141,292, filed Oct. 20, 1993, entitled "Apparatus for Providing a Uniform, Consolidated, Unidirectional, Continuous, Fiber-Reinforced Polymeric Material and Method Relating Thereto".

BACKGROUND OF THE INVENTION

1. Field of the Invention

The present invention relates generally to prepreg ribbons. In particular, it relates to prepreg ribbon forms which have non-rectangular architectures.

2. Description of the Related Art

Ribbonized prepreg is used in the automated placement process where ribbons are robotically managed and continually fed onto a tool or part surface and adhered by application of heat and pressure. This automated placement process is particularly sensitive to ribbon material quality when considering low-flow matrix materials. The simultaneous assembly of adjacent ribbons (typically 4 to 34) offers significant advances in the lay-up of composite prepregs. The low-flow matrix materials (which are often high performance) combined with lack of ribbon cross-sectional dimensional integrity, and most importantly, the existence of the standard rectangular cross-section, complicates the automated placement process frequently rendering poor results. Although ribbons are bonded to their vertical neighbor (directly below) satisfactorily, the failure to make quality parts is generally attributed to the poor bonding of adjacent ribbons to each other. Low-flow thermoplastic parts made by using slit prepreg tapes are typically unconsolidated and exhibit excessive porosity and void content. High to moderate-flow matrix prepreg tapes and ribbons generally provide well consolidated, void-free parts. This contrast can be attributed to the correcting melt-flow nature of the high-flow matrix which allows for simultaneous congregation and filament intermingling of neighboring ribbons.

An object of the present invention is to provide a prepreg ribbon having a cross-sectional geometry which promotes intimate lateral contact between adjacent composite tows.

Another object of the present invention is to prepare a composite from the prepreg ribbons having the aforementioned geometry.

SUMMARY OF THE INVENTION

The objects of the present invention were met by providing a prepreg ribbon having a cross-sectional geometry which promotes intimate lateral contact or nesting between adjacent tows. The cross-section has a plane of contact which provides intimacy of joining upon normal processing. Examples of such cross-section include a triangle, a trapezoid, a parallelogram, and a polygon having more than 4 sides. Essentially, any shape will meet the objectives of the invention as long as it is not rectangular or circular and allows for nesting of the ribbons upon consolidation.

DESCRIPTION OF THE PREFERRED EMBODIMENTS

Figure 1A:
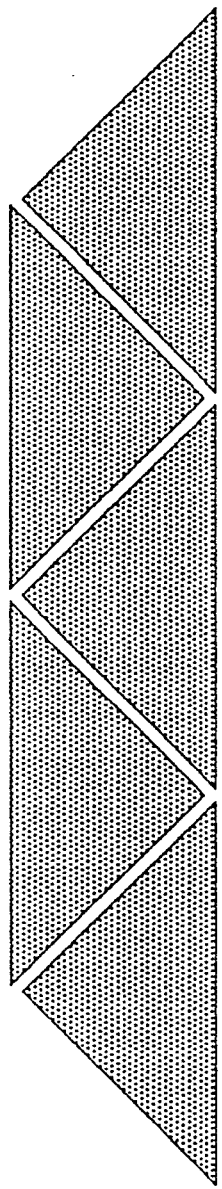
FIG. 1A is a diagram of the triangular cross-sectional geometry.
Figure 1B:
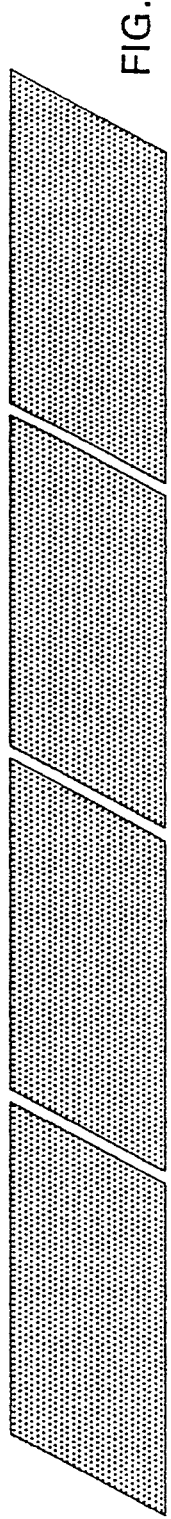
FIG. 1B is a diagram of the parallelogram cross-sectional geometry.
Figure 1C:
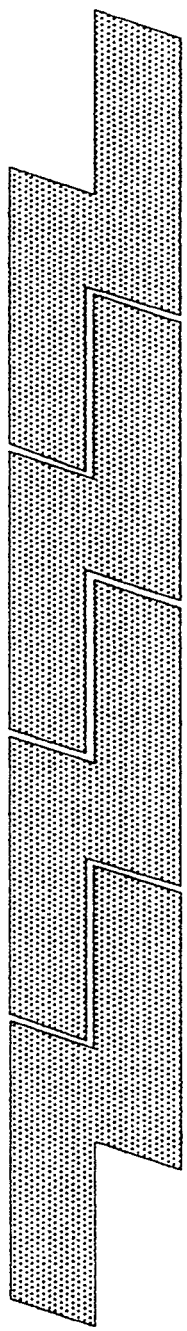
FIG. 1C is a diagram of the cross-sectional geometry for a polygon having more than 4 sides.
Figure 1D:
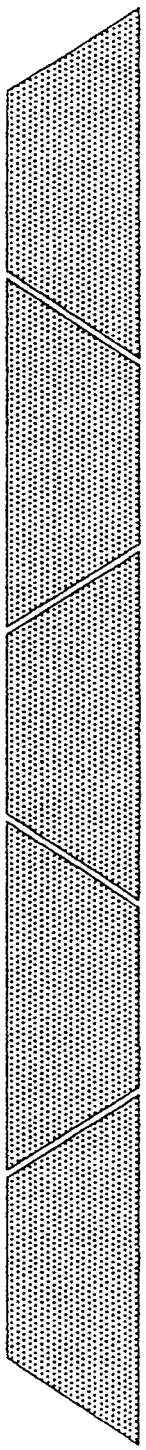
FIG. 1D is a diagram of the trapezoidal cross-sectional geometry.
Figure 2:
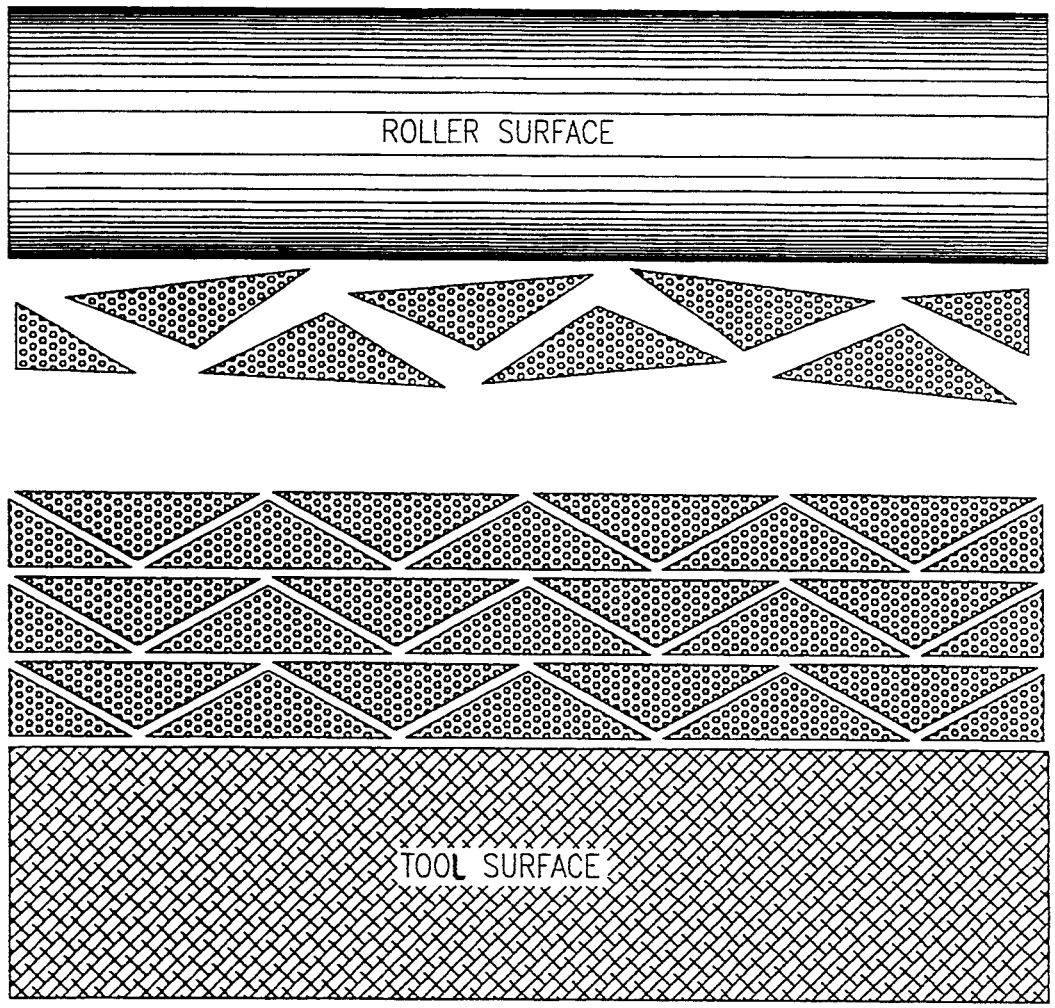
FIG. 2 is a diagram of the grouping and alignment of the ribbons.

As a measure of the capabilities of the current technology, a low-flow hot-melt prepreg tape was slit into ¼ inch rectangular ribbons and robotically placed onto a tool surface. Following a robotic in-situ manufacturing process known to those skilled in the art, a flat panel section was produced. The panel was placed into an autoclave and processed under vacuum, pressure and heat. The resulting panel contained adjacent ribbon overlaps and gaps. Mechanical testing proved this part was unacceptable.

A low-flow, 12 K, powder coated towpreg was heated and shaped into a non-rectangular cross-sectional architecture. This was achieved by continuously pulling the powder coated towpreg through a forming means wherein the towpreg was consolidated and pre-shaped into a wide, flat, cross-sectional form. Upon exiting the forming means, the towpreg was consolidated into a malleable, wide, flat, cross-sectional form and passed into a shaping means. The shaping means reshaped the malleable, consolidated, flattened polymeric prepreg material into a towpreg having a non-rectangular cross-sectional architecture. Utilizing the same process as that which was disclosed for the slit tape, a composite part was fabricated. The part was well consolidated.

What is claimed as new and desired to be secured by Letters Patent of the United States is:

1. A shaped towpreg ribbon having a cross-sectional geometry which promotes intimate lateral contact between adjacent towpreg ribbons having a similar cross-sectional geometry wherein the cross-sectional geometry is selected from the group consisting of: a triangle, a trapezoid, a parallelogram, and a polygon having more than 4 sides.

2. The shaped towpreg ribbon according to claim 1, wherein the cross-sectional geometry is a triangle.

3. A composite prepared from the shaped towpreg ribbon according to claim 1.

* * * * *